Jan. 24, 1933. P. C. CHRISTIANSEN Re. 18,721

DEVICE FOR PRESSING ARTICLES

Original Filed Feb. 25, 1929

INVENTOR
PAUL C. CHRISTIANSEN,
BY
Paulmier & Paulmier
ATTORNEYS

Reissued Jan. 24, 1933

Re. 18,721

UNITED STATES PATENT OFFICE

PAUL CHRISTEN CHRISTIANSEN, OF COPENHAGEN, DENMARK

DEVICE FOR PRESSING ARTICLES

Original No. 1,772,707, dated August 12, 1930, Serial No. 342,623, filed February 25, 1929, and in Denmark March 1, 1928. Application for reissue filed July 31, 1931. Serial No. 554,319.

Devices are known by which the imprinting of articles is carried out thereby that a non-rotating blank is pressed around a similarly stationary counter pressure member of a suitable cross section by means of a number of rotating pressing members located with equidistant intervals around a common axis of rotation identic with the axis of the counter pressure member. In these known devices spring force is employed to press the rotating pressing members against the blank, but this gave rise to the deficiency that the pressure of the pressing members against the blank increases when the diameter of the blank increases. If e. g. a blank is pressed over a conical counter pressure member, the pressure with which the pressing members act upon the blank becomes greater and greater as the pressing proceeds to broader and broader portions of the cone.

By the present invention this defect is avoided, the invention having for its object that the spring or tightening member pressing the pressing member against the counter pressure member is pivotally mounted in an axial plane and may be kept in any swung position. Blanks may, therefore, be pressed around a counter pressure member without the pressure of the pressing member against the blank becoming dependent of the radius of the latter, or pressing may be carried out over counter pressure members with varying diameter without varying the pressure of the pressing member upon the blank, when only the spring is able to be swung to varying positions during the pressing.

As a result of the foregoing objects and method of operation the horizontal portion of the metal supported on the top of the cone is not disturbed in its structure. The portions of the metal engaged by the pressing members 2 is extruded gradually in a spiral annular path as those members rotate and descend, the thickness of such metal so treated decreasing but the metal only moving and extending along the path of the metal so treated, leaving undisturbed the metal on top of the cone and the metal adjacent the bottom of the cone, as at 3, the result being that the part so treated is of lesser thickness than the untreated parts and the untreated parts are not changed, drawn, twisted or otherwise altered internally or externally.

Figure 1:
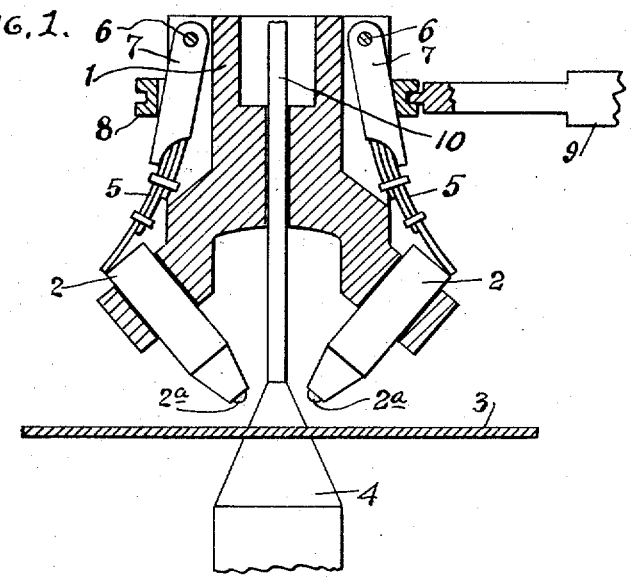
Figure 2:
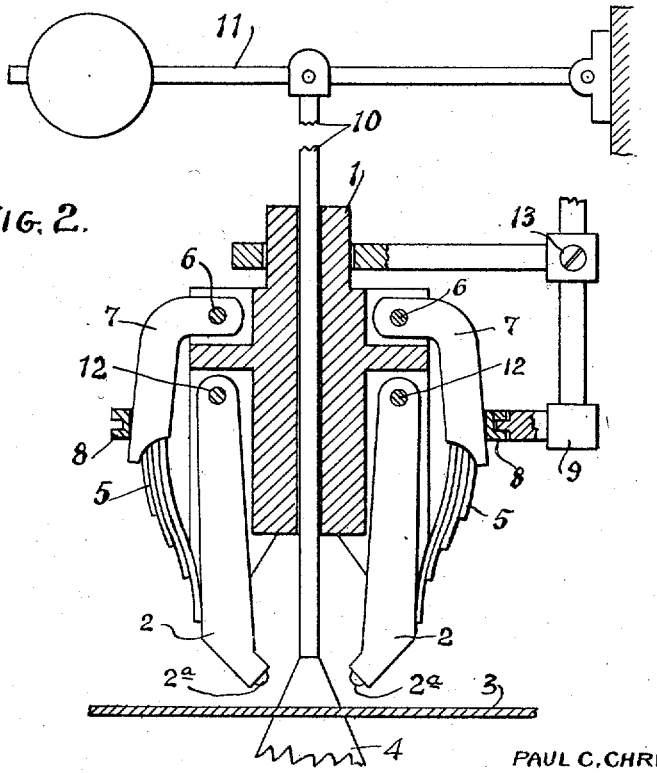

In the following a couple of examples of constructional forms of the present invention shall be given in order to further explain the invention, reference being had to the accompanying drawing, in which Figure 1 is a diagrammatical elevation of a constructional form of the invention, partly in section; Figure 2 is an elevation of another constructional form, partly in section.

In Figure 1, 1 is a carrier rotating about an axis identical with that of the counter pressure member and carrying the several parts of the device, which carrier is called, for shortness' sake, the tool carrier throughout the specification and claims. 2 designates two pressing members slidably mounted in holes in the tool carrier the expression "pressing members" meaning the combination of the actual part acting upon the blank (pressing steel, molette, etc.) and the carrier or shaft with which such parts are often connected (by welding, soldering, screwing or in another way). 3 of the blank, and 4 the counter pressure member. The pressing members 2 are pressed towards the axis of rotation of the device by springs 5 shown in the drawing as laminated springs, the laminæ of which are kept together at one end by spring carriers 7. The springs 5 are pivotally mounted on pivots 6 connecting them with the tool carrier 1, in which they are countersunk, as shown in the drawing, so that near the pivots 6 they do not normally project from the surface of the tool carrier 1. A ring 8 surrounds the tool carrier and springs 5 or rather their carriers 7. The ring 8 may be displaced in the direction of the axis of rotation by means of a fork 9. In a central bore a press rod 10 is located so as to be both displaced and rotated relatively to the tool carrier 1. A spring (not shown) presses the outer somewhat broader end of the press rod against the blank 3, which rests on the counter pressure member 4. The device acts in that way that both the counter pressure member 4 and the blank 3 remain without rotation, while the tool carrier 1 is caused to rotate. When, now, the counter pressure member 4 and the tool carrier 1, guided if wanted in a suitable machine, are approached to each other, so that their axes remain coinciding, the press rod 10 will first touch the blank and press it firmly against the counter pressure member 4. Thereafter also the pressing members will come into contact with the blank and press still new portions thereof against the sides of the counter pressure member, as the latter and the tool carrier approach each other successively more and more. If the springs 5 were clamped in an invariable position, they would exert a steadily increasing pressure upon the pressing members 2, as these members act on an increasing radius. It is this fact that had for its result in the known devices that even by a very abundant lubrication the pressing members seized at least the blank and spoiled it. According to the present invention the tension of the springs may be released successively thereby that the ring 8 is moved backwards, which may take place automatically, if so wanted. According to Figure 2 the pressing members are pivoted to the tool carrier 1 by pivots 12. The counter pressure member 4, springs 5, which are kept by spring carriers 7 and pivotally mounted on pivots 6, and press rod 10 correspond to similar parts in Figure 1. The press rod 10, however, is not here spring-loaded but influenced by a loaded lever 11. The ring 8 surrounds the springs 5 or rather the spring carriers 7 and is displaced in the axial direction by the fork 9, which is slidably mounted in a fork carrier 13.

Instead of being freely pivoted and supported, besides, in a movable point (viz. by means of the ring 8) as in the shown constructional forms, the springs 5 may be pivoted and kept in any position in many other ways. For instance, the movable supporting point corresponding to the ring 8 may be displaced for each of the springs (spring carriers) to the opposite side of the pivot 6 of the spring in question, so that the springs are loaded as two-armed levers. Also the springs may be simply held by a suitable screw device. The manner in which they are secured in the constructional examples seems, however, to be the preferred one, but may be so changed, if wanted, that the pivots 6 are replaced by projections over which the spring carriers may oscillate with a corresponding recess, so that the springs may be easily replaced. In the drawing both constructional forms are shown as having two pressing members 2 diametrically opposite to each other. The device may, however, also be constructed with more than two pressing members or with only one pressing member, the one-sided pressure of which upon the blank must, then, be counter-balanced in a suitable manner as e. g., by a clamping device. When the springs are tolerably long and allow the pressing members to be swung out into their utmost positions without making the pressure on the pressing members too great, they may be rigidly secured at their upper ends instead of being pivotally mounted on pivots 6. The adjustment of the pressure of the springs on the pressing members may nevertheless be carried out by an axially displaceable ring 8 or the like, as in the devices specified above.

The invention may be varied in many other ways, both as regards the shape of the individual parts and as regards the manner in which they are combined.

I claim:

1. An article pressing device for use in connection with a non-rotating blank including pressure members, a rotatable carrier for said pressure members, pressure exerting means mounted to swing in an axial plane with respect to said carrier and coacting with the pressure members to move the latter in the direction of the blank, and means for varying the position of the pressure exerting means with respect to the carrier.

2. An article pressing device for use in connection with a non-rotating blank including pressure members, a rotatable carrier for said pressure members, pressure exerting means mounted to swing in an axial plane with respect to said carrier and coacting with the pressure members to move the latter in the direction of the blank, and means for varying the position of the pressure exerting means with respect to the carrier, whereby to vary the degree of pressure exerted on the pressure members.

3. An article pressing device for use in connection with a non-rotating blank including pressure members, a rotatable carrier for said pressure members, pressure exerting means mounted to swing in an axial plane with respect to said carrier and coacting with the pressure members to move the latter in the direction of the blank, and means for varying the position of the pressure exerting means with respect to the carrier, said last mentioned means being movable axially of the carrier and coacting with the pressure exerting means to vary the pressure exerted by the latter.

4. An article pressing device for use in connection with a non-rotating blank including pressure members, a rotatable carrier for said pressure members, pressure exerting means mounted to swing in an axial plane with respect to said carrier and coacting with the pressure members to move the latter in the direction of the blank, and means for varying the position of the pressure exerting means with respect to the carrier, and means coacting with the pressure exerting means and movable between the pivot points of the latter and their points of engagement with the pressure members for varying the pressure exerted on the latter by the pressure exerting means.

5. An article pressing device for use in connection with a non-rotating blank including pressure members, a rotatable carrier for said pressure members, pressure exerting means mounted to swing in an axial plane with respect to said carrier and coacting with the pressure members to move the latter in the direction of the blank, and means for varying the position of the pressure exerting means with respect to the carrier, said pressure exerting means being counter-sunk in said carrier and regulating means associated with the pressure exerting means movable along said carrier.

6. An arrangement as claimed in claim 1, characterized in that said pressure exerting means is secured at one end so as to be movable in axial planes whereby the adjustment of the pressure exerted by the pressure exerting means may be varied by changing the free length thereof.

7. In a machine for forming pressed articles of metal having sides and an end, the combination of oppositely disposed forming and rotating spring operated pressers, means for rotating said pressers against the sides of said article, means for moving said forming pressers longitudinally relatively to one another, and means of adjusting the application of said pressers to the metal during said rotation and relative movement to conform to the form and maintaining relatively uniform pressure.

8. In a machine for forming pressed articles of metal having sides and an end, the combination of forming and rotating pressers, means for rotating said pressers, means for moving said forming pressers longitudinally relatively to one another against the outside of said article, means of adjusting the application of said pressers to the outside of the metal during said rotation and relative movement to conform to the form and maintaining relatively uniform pressure, and means of retaining the metal on the form in the zone that is not being subjected to pressure.

9. The method of forming a vessel from a blank sheet which comprises supporting the sheet on a form that is to form the bottom of the vessel, pressing the sheet under spring pressure in successive areas along the sides of the vessel and leaving intact the portion of the sheet forming the bottom of the vessel.

10. The method of forming pressed articles which comprises applying a blank sheet on the end of a form, pressing on the sheet in a direction axial of the pressers and in successive areas along the exterior sides of the form with a spring pressure throughout the successive areas and leaving unpressed the portion of the sheet at the end of the form.

11. The method of forming a pressed article having a bottom and sides from a sheet which comprises applying the sheet to a form, pressing by elastic pressure the sheet in successive areas along the configuration of the form to form the sides of the article and leaving the bottom of the article unpressed.

12. The method of forming a pressed article comprising supporting a sheet horizontally on top of a form, spring pressing the sheet through a spherical end presser downwardly in successive areas over said form to conform to the sides thereof without disturbing the horizontal portion of the sheet forming the bottom of the article, retaining the bottom of the article on the top of the form while exerting the pressure on the sides.

In testimony whereof I have signed my name.

PAUL CHRISTEN CHRISTIANSEN.